United States Patent [19]

Hirao et al.

[11] Patent Number: 4,587,655
[45] Date of Patent: May 6, 1986

[54] FAIL-SAFE SYSTEM FOR VEHICULAR COMPUTER

[75] Inventors: Yoshikazu Hirao, Tokyo; Shigeo Umesaki, Saitama, both of Japan

[73] Assignees: Honda Giken Kogyo Kabushiki Kaisha; Oki Electric Industry, Co., Ltd., both of Tokyo, Japan

[21] Appl. No.: 541,207

[22] Filed: Oct. 12, 1983

[30] Foreign Application Priority Data

Oct. 12, 1982 [JP] Japan ............................. 57-179359

[51] Int. Cl.⁴ ...................... G06F 11/00; G06F 15/20
[52] U.S. Cl. .................................. 371/12; 364/431.11
[58] Field of Search ......................... 371/12, 13, 14; 364/431.11, 200, 900

[56] References Cited

U.S. PATENT DOCUMENTS

| | | | |
|---|---|---|---|
| 4,205,376 | 5/1980 | Yoshida | 364/431.11 X |
| 4,282,573 | 8/1981 | Imai et al. | 364/431.11 |
| 4,410,938 | 10/1983 | Higashiyama | 364/431.11 X |
| 4,488,303 | 12/1984 | Abramovich | 371/12 X |

*Primary Examiner*—Charles E. Atkinson
*Attorney, Agent, or Firm*—Armstrong, Nikaido, Marmelstein & Kubovcik

[57] ABSTRACT

A fail-safe computer system for vehicle control, the system comprising a CPU having at least two computer status information outputs and an interruption request input. The system further comprises a detecting logic circuit having the inputs thereof coupled to the status information outputs and having the output thereof coupled to the interruption request input, wherein upon detection of a HALT signal at any of the status outputs by the logic circuit, the logic circuit applies an output to the interruption request input whereby the computer system is reset to a predetermined state thereof.

4 Claims, 2 Drawing Figures

NOR gate

FAIL-SAFE SYSTEM FOR VEHICULAR COMPUTER

BACKGROUND OF THE INVENTION

1. Field of the Invention

The present invention relates to a fail-safe system for a vehicular computer and more particularly to a fail-safe system for a vehicular computer which controls the operation of an internal combustion engine mounted in a vehicle such as an automobile or the like.

2. Description of the Prior Art

In general, the term "fail safe" means that the entire system operates safely upon occurrence of malfunction of a device. The fail safe is indispensable to such vehicles as electric trains and automobiles in which malfunction can lead directly to a serious accident.

For example, a control system may be used to control the operation of an internal combustion engine mounted in a vehicle such as an automobile or the like, the control system including fuel injection control and ignition timing control. The electronic control system utilizes a stored-program microcomputer. In general, however, the environment of the devices mounted in an automobile is very bad and the devices are influenced by vibrations, temperatures, external noises, etc.

Particularly, the noise induced at the time of ignition of a spark plug appears on a bus, etc. as electrical noise. This may result in that, when a central processing unit (hereinafter referred to as "CPU") reads out data from a memory, the fetched instruction changes to a HALT instruction so the normal operation of the program by the computer is stopped when it should be continued. Further, if the HALT instruction is executed in an interrupt inhibit state, restart based on software becomes unfeasible and the function of the computer is lost completely. This produces a serious hindrance to the operation of the controlled system.

In order to avoid the above-mentioned inconvenience caused by malfunction, a method such as shown in FIG. 2 has heretofore been adopted. More particularly, in FIG. 2, which illustrates a system configuration of a vehicular computer, a vehicular computer unit 1 comprises a CPU 2, a memory 3 and an input/output device 4. The CPU 2, memory 3 and input/output device 4 are interconnected through buses 5, 6 and 7. The memory 3 stores a control program for controlling the operation of, for example, an internal combustion engine, as well as various data, etc. The input/output device 4 has the function of inputting data from the exterior and outputting processing results to the exterior. The CPU 2, which comprises an arithmetic processing section, a register section and a control section, performs various arithmetic operations and the execution of program.

To the CPU 2 is connected a timer 8 called "watch-dog timer" for watching the operation of the CPU 2 at all times. The timer 8 exhibits the foregoing fail-safe function for resetting The CPU 2 to its normal state upon occurrence of malfunction. More specifically, a reset signal a, synchronous with the clock pulse of the CPU 2, is provided from a reset output terminal RO of the CPU to the timer 8. The timer 8 is set to count a preset time of a period longer than that of the period of the reset signal a, so while the CPU 2 is in the normal state the counting of the timer 8 is continuously reset by the reset signal a before it reads its preset count. But, upon occurrence of malfunction, the output of the reset signal a is stopped, so the timer 8 reaches the preset time and provides an initializing signal b to a reset input terminal RI of the CPU 2 to reset the CPU to the initial state.

However, such conventional method requires the additional provision of the timer 8, thus leading to an increase in cost and size of the computer unit, deterioration of reliability caused by a more complicated circuit configuration, and an increased burden on the software for resetting the timer 8, which causes a further increase of cost.

SUMMARY OF THE INVENTION

In order to eliminate the above-mentioned drawbacks of the prior art system, the present invention provides a fail-safe system for a vehicular computer which controls the operation of, for example, an internal combustion engine, the feature of which system resides in detecting that the computer, especially the CPU, is executing a HALT instruction, by means of a logic circuit such as a NOR gate which utilizes status information provided from the computer. The NOR gate effects an interruption at a top-level priority in accordance with the result of the detection to reset the computer to the initial state.

DETAILED DESCRIPTION OF A PREFERRED EMBODIMENT

Figure 1:
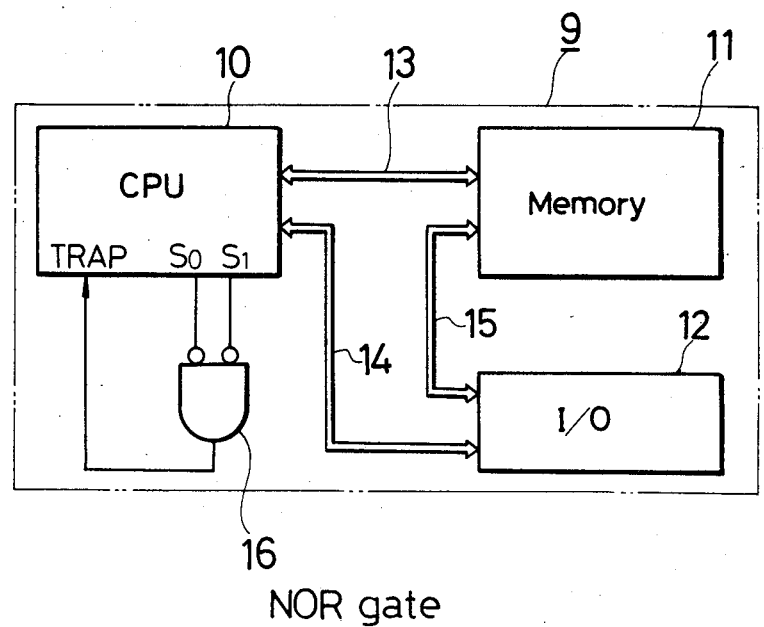
FIG. 1 is a system configuration diagram of a vehicular computer incorporating the present invention.

Referring to FIG. 1, a vehicular computer unit 9 comprises a CPU 10, a memory 11 and an input/output device 12. The CPU 10 and the memory 11, the CPU 10 and the input/output device 12, and the memory 11 and the input/output device 12, are interconnected through buses 13, 14 and 15, respectively, for transmission of information.

Figure 2:
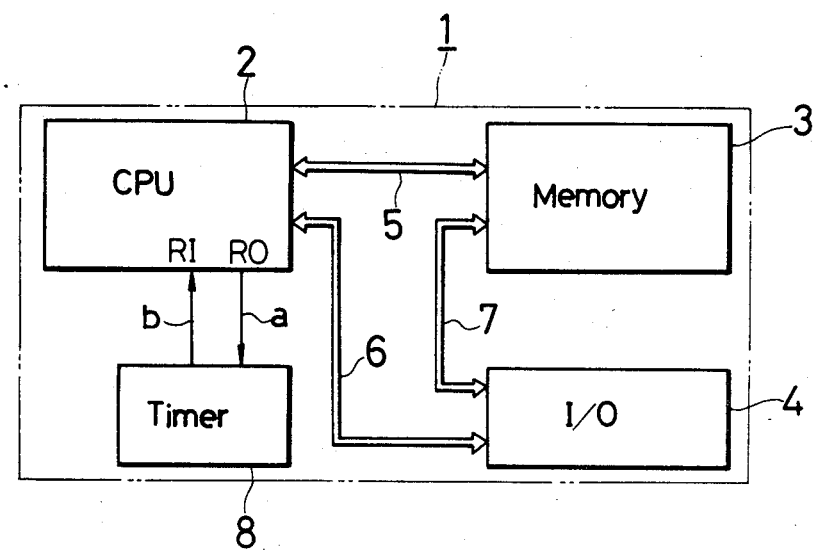
FIG. 2 is a system configuration diagram of a conventional vehicular computer.

The memory 11 is the same as the memory 3 shown in FIG. 2. As an example, it may be a random access memory (RAM) and/or a read only memory (ROM) such as an IC memory. The memory 11 stores a control program for executing the control of operation of an internal combustion engine, as well as data and results of arithmetic operations performed by the CPU 10. The input/output device 12, which is the same as the input/output device 4 shown in FIG. 2, has the function of inputting to the CPU 10, detected data from various sensors attached to various points of the internal combustion engine for detecting the actual state of operation, and providing control signals to various actuators in the fuel supply system, ignition system, etc. in accordance with the results of operations performed by the CPU 10.

The CPU 10, which comprises an arithmetic processing section, a register section and a control section, utilizes a single large scale integrated circuit (LSI) device such as an Intel No. 8085A. The CPU 10 performs various arithmetic operations and the execution of the program. Basically, it may be the same as the CPU 2 shown in FIG. 2.

As mentioned above, the CPU 10 is usually a single LSI device. This type of device is usually provided with a plurality of status signal terminals for indicating the status of the CPU to the exterior. In this embodiment, two status signal terminals $S_0$ and $S_1$ are utilized.

The status signal terminals $S_0$ and $S_1$ are connected to a NOR gate 16, the output terminal of which is connected to a TRAP terminal having a top-level priority. The status signal terminals $S_0$ and $S_1$ may be set so as to provide any outputs. In this embodiment, status signals are provided according to the following truth table.

TRUTH TABLE

| Status | $S_0$ | $S_1$ | NOR Output |
|---|---|---|---|
| (a) Memory or I/O Write | 1 | 0 | 0 |
| (b) Memory or I/O Read | 0 | 1 | 0 |
| (c) Opcode Fetch or Interrupt Acknowledge | 1 | 1 | 0 |
| (d) HALT | 0 | 0 | 1 |

Thus, by decoding the status of $S_0$, $S_1$ = "0", "0", it is possible to detect that the HALT instruction is being executed. Usually, this status information is utilized for the purpose of an external indication of the status of the device, but in the present invention, it is utilized for a fail safe purpose.

Further, usually a plurality of interruption request terminals are provided, but since the output terminal of the NOR circuit 16 is connected to the TRAP terminal which is an interruption request terminal having a top-level priority, it is possible to effect interruption regardless of the status of the CPU 10 during which the malfunction occurs, for example, even in an interruption inhibit state.

The operation of the vehicular computer unit 9 having the above-described construction will be described below.

In the normal condition, the computer unit 9 is held in any of the statuses (a), (b) and (c), so the output of the NOR circuit 16 is "0", namely, at low level.

When a HALT instruction is being executed due to malfunction caused by external noise or the like, although the computer unit 9 itself is in the normal condition, the output of the NOR circuit 16 becomes "1", namely, high level. As a result, since TRAP terminal is an interruption request terminal having a top-level priority, the interruption request is accepted no matter what the status of computer unit 9, even if, for example, the HALT instruction is being executed.

Such interruption is adapted to cause a jump to a specific address, where there is stored, in advance, a program for resetting the computer to the initial state, or a JUMP instruction to the "0000" address which is the start address just after applying power. This effects the restart of the control program.

Thus, in this embodiment, the computer reverts to the initial state upon execution of a HALT instruction, so it becomes impossible to place a HALT instruction in the regular control program. This does not cause any problems because in the control of an internal combustion engine, it is usually not necessary to execute a HALT instruction, and even when it is necessary to do so, a JUMP instruction may be used for looping to a predetermined address.

Further, although in the foregoing embodiment, the output of the NOR circuit 16 is applied to the interruption request terminal having a top-level priority, it may be applied to the reset input terminal RI as shown in FIG. 2 to reset the computer to the initial state, and even in this case, the same effect is obtainable. Moreover, although the foregoing embodiment has referred to the case of four status modes of the computer using two status signal terminals, i.e., 2-bit information, the method of the present invention is applicable to a computer having any plural number of status signal terminals by using a logic circuit for detecting that a HALT instruction is under execution.

According to the fail-safe system for a vehicular computer of the present invention, as will be apparent from the above description, status information usually employed for indicating the status of a computer is utilized, from which the present execution of a HALT instruction is detected, and the computer is reset to the initial state on the basis of the detected result. The detector means for detecting such status information may be of an extremely simple circuit configuration such as, for example, a NOR circuit without the need of such detecting software as has heretofore been used. Consequently, it is possible to attain a reduction of cost and assure positive operation because of a more simplified circuit configuration, that is, a more reliable fail-safe method can be provided.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A fail-safe computer system for vehicle control, said system comprising:
   (a) a CPU means having at least two CPU status information outputs and an interruption request input;
   (b) a detecting logic circuit means having the inputs thereof coupled to said status information outputs and having the output thereof coupled to said interruption request input, wherein upon detection of a HALT signal at any of said status outputs by said logic circuit means, said logic circuit means applies an output to said interruption request input whereby said CPU means is reset to its initial state just after power is applied to said system; and
   (c) said interruption request input of said CPU means being a top-level priority input and being non-maskable.

2. A fail-safe computer system as set forth in claim 1, wherein said detecting logic circuit means is a NOR gate.

3. A fail-safe computer system as set forth in claim 1, wherein said system includes a memory and wherein said CPU means generates a JUMP instruction for addressing said memory to a specific address in response to an output from said logic circuit means being applied to said interruption request input of said CPU means.

4. A fail-safe computer system as set forth in claim 3, wherein said specific address is the initial address after power is applied to said system.

* * * * *